United States Patent [19]

Schulte

[11] Patent Number: 4,928,377
[45] Date of Patent: May 29, 1990

[54] MACHINE TOOL

[75] Inventor: Karl-Heinz Schulte, Lennestadt, Fed. Rep. of Germany

[73] Assignee: Muhr und Bender Maschinenbau GmbH, Attendorn, Fed. Rep. of Germany

[21] Appl. No.: 424,031

[22] Filed: Oct. 19, 1989

[30] Foreign Application Priority Data

Nov. 8, 1988 [DE] Fed. Rep. of Germany ....... 3838198

[51] Int. Cl.⁵ .................. B23P 23/00; B21D 43/00; B26D 9/00
[52] U.S. Cl. .................................. 29/560; 72/481; 83/552
[58] Field of Search ............... 29/560, 560.1, 564, 29/33 Q, 33 R, 33 J; 83/552, 559, 560, 682, 527; 72/455, 469, 470, 472, 482, 481, 442, 448, 404, 387, 389, 324, 464

[56] References Cited

U.S. PATENT DOCUMENTS

| 3,942,431 | 3/1976 | Goff | 72/470 X |
| 4,241,632 | 12/1980 | Seo | 83/560 |
| 4,250,784 | 2/1981 | Bredow | 83/552 X |
| 4,587,830 | 5/1986 | Mills | 72/442 |
| 4,691,554 | 9/1987 | Murphy | 72/481 X |
| 4,733,552 | 3/1988 | Lefils | 72/472 X |
| 4,738,018 | 4/1988 | Ebrahimian | 29/560 |

FOREIGN PATENT DOCUMENTS 0180146 10/1985 European Pat. Off. .
1004891 4/1953 Fed. Rep. of Germany .
2146569 4/1985 United Kingdom ............... 72/481

Primary Examiner—William Briggs
Attorney, Agent, or Firm—Browdy & Neimark

[57] ABSTRACT

A machine tool having a machine frame open on three sides in the shape of the letter C, comprising an upper die support, disposed on the machine frame and vertically movable by a drive cradle, with at least two die holding fixtures placed side by side and having corresponding upper dies, a lower die support disposed on the machine frame with a corresponding number of die holding fixtures placed side by side and having corresponding lower dies, and a matrix plate clamped on the lower die support, disposed in a frame containing the die holding fixtures. In this configuration, it is possible to use a self-guided tool unit in an equally flexible manner as the normal upper and lower dies, by disposing, instead of a lower die, a tool unit comprising an upper die and a lower die contained in a guide frame, such as a cutting unit or a coping unit, on a matrix plate in a corresponding die holding fixture, and to drivingly couple it with the upper die support.

18 Claims, 3 Drawing Sheets

MACHINE TOOL

FIELD OF THE INVENTION

The invention relates to a machine tool having a machine frame open on three sides, preferably in the shape of the letter C, comprising an upper die support disposed on the machine frame and vertically movable by a drive cradle, and at least two die holding fixtures placed side by side and having appropriate upper dies, a lower die support disposed on the machine frame with a corresponding number of die holding fixtures placed side by side and having appropriate lower dies, and a matrix plate placed on the lower die support, preferably disposed in a frame, containing the die holding fixtures.

BACKGROUND OF THE INVENTION

A machine tool (EPA 0 180 146) which is a multi-stamp machine tool with at least three, often with five die holding fixtures disposed side by side in the upper die support, with upper dies, in particular stamping punches disposed therein, and a corresponding number of lower die holding fixtures with corresponding lower dies, in particular punch dies is known.

The upper dies can be changed particularly quickly, either individually or as a whole, because a locking cap, which secures all die holding fixtures on the upper die support at their front ends, is pivotably linked with the upper die support and can be locked with it. When the locking cap is opened, each individual upper die or all upper dies together can be simply pulled horizontally out of the die holding fixture which is horizontally opened on one side, or, correspondingly, other upper dies can be horizontally inserted.

The die holding fixtures at the lower die support are located in a matrix plate which, in turn, is inserted in the frame of a saddle plate. The matrix plate can always be placed into its desired position in a few steps by inserting the matrix plate into the frame of the saddle plate and locking it in this frame. The number of upper and lower dies which can be used simultaneously depends on the number and size of the upper and lower dies. Depending on the number and size of the lower dies, there are different exchangeable matrix plates available.

It is known per se, in connection with machine tools having an upper and a lower die, to combine the upper die and the lower die in a tool unit including a guide frame, in particular, in a cutting unit or coping unit (German Published, Examined Patent Application DE-AS 10 04 891). This known machine tool has a coping unit as a tool unit. The upper die is vertically guided in guide rails of a guide frame and has at its upper end hammerhead-shaped coupling means, into which corresponding coupling means on the upper die support, in this case, in the shape of a T-groove, can be inserted. The guide frame of the tool unit receiving the lower die has as coupling means at its lower end, a plate in the shape of an inverted T, into which coupling means in the shape of a T-groove on the lower die support can be inserted. Thus, in this known machine tool, the entire tool unit is engagingly inserted as a whole in the longitudinal direction of the machine frame from the open front end between the upper and lower die supports. This is particularly practicable because it permits a quick and rapid exchange of the work unit due to the self-guidance of the dies in the tool unit, and it is possible at the same time to compensate for or to absorb within the tool unit, lateral forces occurring during cutting or coping.

However, this known machine tool with a tool unit is not sufficiently flexible in that, for bevel cuts with different angles, it is necessary to exchange one tool unit between two cuts for another tool unit having the next required bevel angle.

SUMMARY OF THE INVENTION

It is therefore an object of the invention to provide an improved design machine tool in which it is possible to use a self-guided tool unit in the same flexible manner as the normal upper and lower dies.

This object is accomplished such that, instead of a lower die, a tool unit comprising an upper die and a lower die in a guide frame, in particular, a cutting unit or coping unit is disposed in a corresponding die holding fixture on the matrix plate and is drivingly connected with the upper die support. In the context of the invention, it is also possible to integrate a self-guided tool unit into the multi-stamp machine tool on which the invention is based, if the tool unit is treated as a lower die, and if the upper die in the tool unit is drivingly coupled with the upper die support. In accordance with the present invention, it is also possible to retain the quick-change system with the locking cap of known machine tools.

There are many possibilities for designing the machine tool of the invention, however, reference is made to the drawings and description for a preferred but non limiting embodiment.

Figure 1:
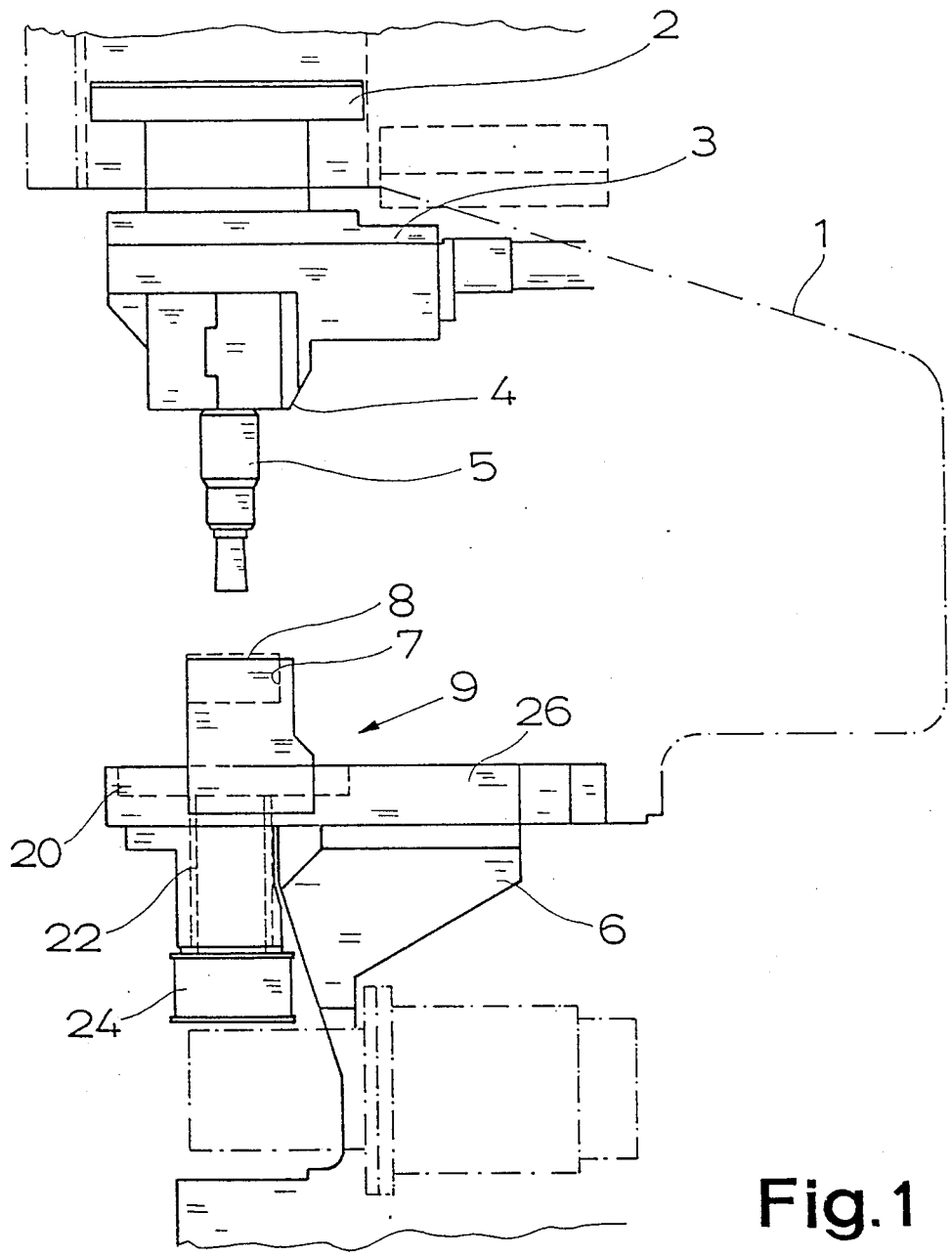
FIG. 1 is a schematic partial lateral view of a machine tool in accordance with the invention.

The machine tool shown in FIG. 1 has a machine frame 1, open on three sides, preferably in the shape of the letter C. An upper die support 3, vertically movable by means of the drive cradle 2, is disposed on the machine frame 1.

Figure 2:
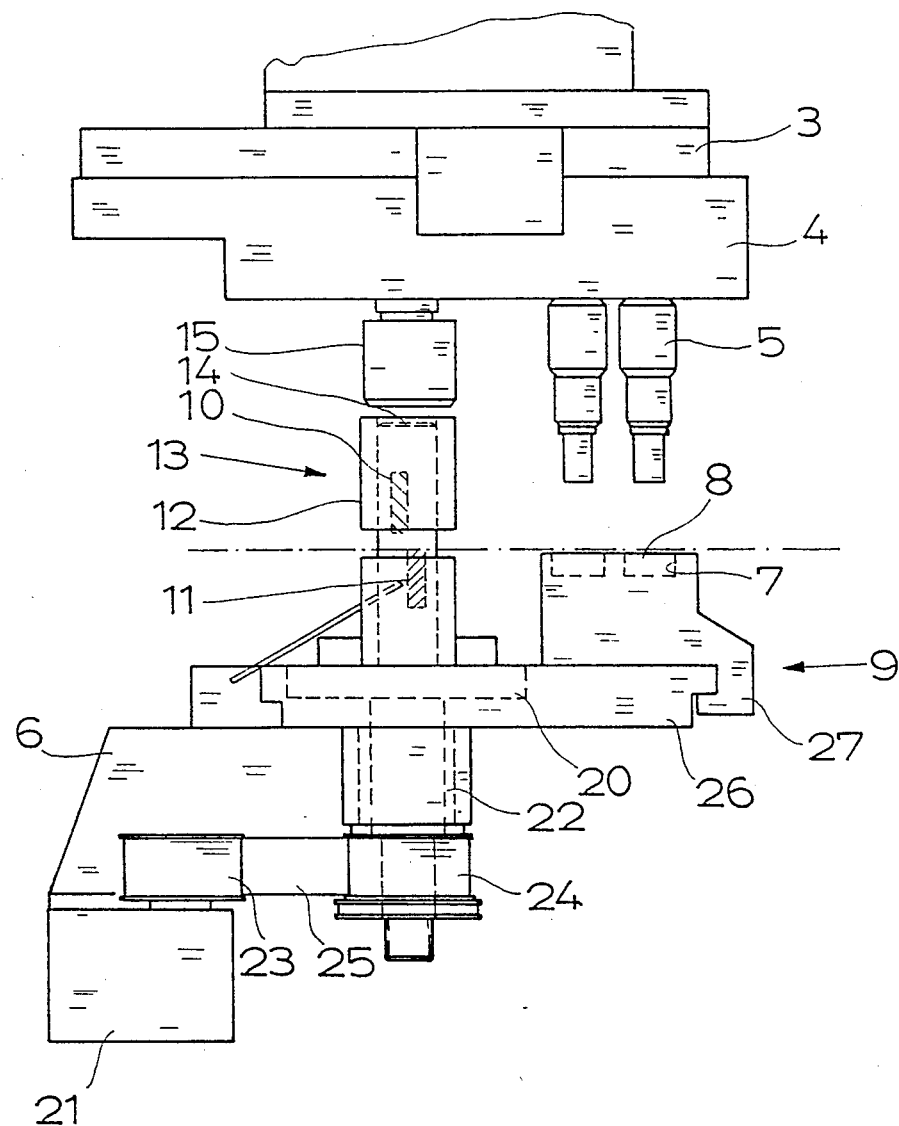
FIG. 2 is a view from the front end of the machine frame of the machine tool of FIG. 1.

In referring to FIG. 2, there is shown an upper die support 3 having a plurality of die holding fixtures 4 with upper dies 5 correspondingly disposed therein. Two stamping punches are depicted as upper dies 5. A lower die support 6 with a corresponding number of die holding fixtures 7 and corresponding lower dies 8 placed side by side is disposed on machine frame 1. Two stamping matrices are shown as lower dies 8 and they correspond to the upper dies 5 in the form of stamping punches.

A matrix plate 9, having die holding fixtures 7, is clamped to the lower die support 6 and is preferably disposed in a frame. The matrix plate 9 can be exchanged in order to place lower dies 8 opposite the correspondingly changed upper dies 5.

In accordance with the invention, it is initially of essential importance that, instead of a lower die, a tool unit 13, in particular, a cutting unit or a coping unit, comprising an upper die 10 and a lower die 11 in a guide frame 12, are disposed on the matrix plate 9, and are drivingly connected with the upper die support 3.

In the preferred embodiment shown, the upper die support 3 is basically prepared to receive five upper dies 5 of normal size, i.e. five stamping punches, and therefore has a total of five die holding fixtures 4. Correspondingly, the lower die support 6 has space for five corresponding die holding fixtures 7. In the embodiment shown, the tool unit 13 takes up the space of several normal lower dies, in this case three lower dies. The tool unit 13 is disposed in such a way that it is placed off-centered on the matrix plate 9.

The entire tool unit 13 must be frictionally connected and inserted between the upper and the lower die supports 3, 6. The frictional connection with the upper die support 3 can be obtained in this system by the tool unit having a coupling part connected with the upper die and by the coupling part (instead of an upper die) being inserted into a corresponding die holding fixture in the upper die support. However, with yet another design of the tool unit 13, it is possible to achieve an even simpler solution, wherein the upper die 10 of the tool unit 13 has a force transfer surface 14 facing towards the upper die support 3, and wherein a push rod 15 seated on the force transfer surface 14 is disposed in the corresponding die holding fixture 4 in the upper die support 3, as seen in FIG. 2.

Figure 3:
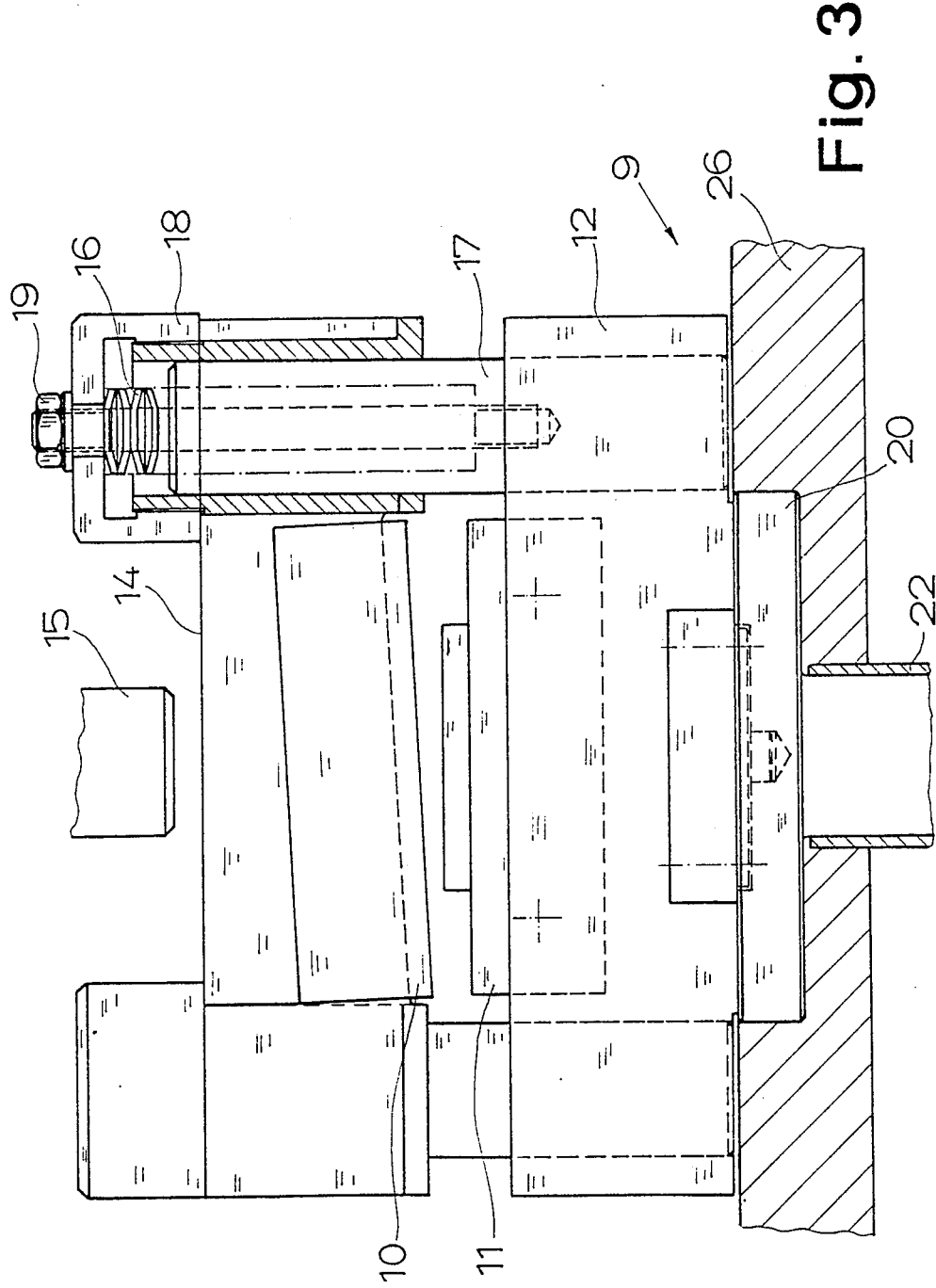
FIG. 3 is an enlarged, partial section of a particularly preferred tool unit for a machine tool in accordance with the invention.

FIG. 3 indicates how the push rod 15 is disposed for seating on the force transfer surface 14.

In the past, the tool unit was designed such that its lower die was fixed, while the upper die could be moved upward or downward by an upper die support.

However, a design of the tool unit 13 is even more practical, which is characterized in that the upper die 10 is prestressed into an open position, where it is lifted off the lower die 11, so that it can be pressed downwardly against the prestress force into the closed, lowered position on the lower die 11. This pre-stressing of the upper die 10 of the tool unit 13 into the opened position complements in a particularly practical manner the use of a push rod 15.

Pre-stressing of the upper die 10 can be accomplished by many means. However, particularly recommended pre-stressing means are springs 16, which can be tension springs, compression springs, coil springs, gas springs, or the like. In the embodiment shown in FIG. 3, pre-stressing of the upper die 10 is generated by two stacks of plate springs. In this connection, FIG. 3 shows, in accordance with the preferred teaching of the invention, that guide frame 12 of the tool unit 13 is in the form of a columnar guide. In this embodiment, springs 16, in particular, the plate springs of the plate spring stacks, are disposed in corresponding guide columns 17. It can be seen that the upper die 10, in this case the upper knife, has been set on the guide columns 17, by means of guide cylinders 18 closed on one side, and the springs 16 in the form of plate spring stacks are disposed in the interior of the guide columns 17. A retaining screw 19, penetrating the center of the springs 16, in the form of plate spring stacks, limits the upward movement of the upper die 10.

As mentioned, known machine tools with a tool unit as previously described, is not sufficiently flexible in that, for bevel cuts with different bevel angles it would become necessary to exchange one tool unit between two cuts for another tool unit having the next required bevel angle.

In accordance with the present invention, a further improvement is that the die holding fixture 7 for the tool unit 13 is disposed axially symmetrically, in particular, as an axial support, and the tool unit 13 is fixed in the die holding fixture 7 on a rotary table 20, which can be rotated in a horizontal plane, as seen in FIGS. 2 and 3. In the invention, it is clear that the use of a self-guided tool unit 13, makes it possible to set any desired bevel angle in a simple manner, by rotating rotary table 20 with respect to the lower die support 6, or the matrix plate 9, when using a cutting unit, such as tool unit 13, and this is a great deal simpler than having to exchange tool unit 13 every time. Furthermore, it is also more economical because it is not necessary to stock tool units 13 for different bevel angles. Corresponding handling advantages will also ensue with other types of tool units having axially non-symmetrical tools.

The rotational movement of rotary table 20 may be limited in one or both rotational directions by stops (not shown). It is also possible to provide intermediate positions by means of locking said table into often occurring rotational angles, for instance in accordance with frequently selected bevel angles. In FIG. 2, the provision of a motor drive, in particular a rotary drive 21, for rotary table 20, is illustrated. A hydraulic motor in the form of a rotary drive 21 is particularly preferred because a hydraulic medium for driving the machine tool can be supplied in many places.

Drivingly connecting the rotary drive 21 with the rotary table 20 may be accomplished in many ways, and such is well within the skill of the art. For example, it is possible to provide the rotary table with a toothed wheel rim extending around the circumference, and the rotary drive with a pinion gear engaged or engageable with the toothed wheel rim. If the total rotational movement of the rotary table is limited by stops to an angle of less than 360., the toothed wheel rim on the circumference of the rotary table must extend over the area of angle actually needed for the rotation. Instead of providing a toothed wheel rim on the outer circumference, the toothed wheel rim could also be provided at the upper outer edge or at another location on the rotary table.

FIGS. 1 and 2 show particularly preferred embodiments of the invention in which the rotary table 20 has a drive shaft 22 extending downwardly through the matrix plate 9 and, wherein the rotary drive 21 acts on the drive shaft 22. However, the rotary drive 21 could act directly on the drive shaft 22 (i.e., the drive shaft 22 could simultaneously be the drive shaft of the rotary drive 21). But, in the exemplary embodiment shown the transfer of force is accomplished in another manner, namely, wherein the rotary drive 21, has a toothed drive wheel 23 and the drive shaft 22 has a toothed drive wheel 24, and and wherein both toothed wheels 23, 24 are connected by means of a chain or a toothed belt 25. In place of toothed wheels, friction wheels in connection with a friction drive can be used.

Because the tool unit 13 can be turned on the rotary table 20, the connection of the tool unit 13, i.e. the driven connection between the tool unit 13 and the upper die support 3, must allow a rotating movement. This can only be accomplished by performing this driven connection in a rotatably symmetrical manner. The rotary symmetrical design or movement is obtained free of constraint if a push rod 15 is provided, which is seated on the force transfer surface 14, and this embodiment corresponds to the preferred teaching of the invention. However, any different connecting system permits rotary movement can also be used.

Before the present invention, it was assumed that a matrix plate such as that shown as 9 had to be a single continuous plate having on the one hand normal die holding fixtures such as 7 for normal lower dies such as 8, and specially designed die holding fixture such as 7 for a rotary table such as 20 for receiving a tool unit such as 13.

However, in accordance with the machine tool of the invention, differently designed machine tool is possible that always has a rotary table 20 and a rotary drive 21 as configured. But in any case, this machine tool can be flexibly retooled, for example, with a matrix plate 9 having five equal normal die holding fixtures 7. To make this flexible retooling possible, the matrix plate 9 must have a lower saddle plate 26, which receives the rotary table 20 in the die holding fixture 7, which is in the form of an axial support, as well as an upper plate 27, which is clamped to the saddle plate 26 and which receives the remainder of the die holding fixtures 7 for lower dies 8. FIG. 2 shows that the upper plate 27, having the two normal die holding fixtures 7 for normal lower dies in the form of stamping matrices, is fastened to the saddle plate 26 by stamping screws. This configurement leaves free the area of the rotary table 20 so that the tool unit 13 can be fixed there to have sufficient space to perform the rotary movement. It is also possible to remove the tool unit 13 from the rotary table 20 and to replace the upper plate 27 by another upper plate which extends across the entire width of the saddle plate 26 and has a total of five normal die holding fixtures 7, for normal lower dies 8, in the form of stamping matrices. In this manner, retooling of the machine tool according to the invention is made possible in a simple fashion.

What is claimed is:

1. A machine tool having a machine frame open on three sides, in approximately the shape of the letter C, comprising, an upper die support disposed on the machine frame and vertically movable by a drive cradle, at least two die holding fixtures placed side by side and having corresponding upper dies, a lower die support disposed on said machine frame with a corresponding number of die holding fixtures placed side by side and having corresponding lower dies, and a matrix plate placed on the lower die support, disposed in a frame and containing the die holding fixtures, wherein instead of a lower die a tool unit, comprising an upper die and a lower die in a guide frame, cutting unit or coping unit, is disposed in a corresponding die holding fixture on the matrix plate and is drivingly connected with the upper die support.

2. A machine tool in accordance with claim 1, wherein the tool unit occupies the space of three lower dies.

3. A machine tool in accordance with claim 1, wherein said tool unit is disposed off-centered on the matrix plate.

4. A machine tool in accordance with claim 1, wherein the tool unit has a coupling piece connected with the upper die and instead of an upper die, the coupling piece is inserted into a corresponding die holding fixture in the upper die support.

5. A machine tool in accordance with claim 1, wherein said upper die of the tool unit has a force transfer surface facing towards the upper die support and a push rod seated on the force transfer surface is disposed in the corresponding die holding fixture in the upper die support.

6. A machine tool in accordance with claim 1, wherein said upper die is pre-stressed into an open position where it is lifted off of the lower die, and is capable of being pressed downwardly against the pre-stress force into a closed, lowered position on the lower die.

7. A machine tool in accordance with claim 6, wherein said pre-stressed upper die is accomplished by means of springs.

8. The machine tool of claim 7, wherein said springs are plate springs in the form of a stock.

9. A machine tool in accordance with claim 7, characterized in that the the guide frame (12) of the tool unit (13) is in the form of a columnar guide, and in that preferably the springs (16), in particular plate springs, are disposed in corresponding guide columns (17).

10. A machine tool in accordance with claim 1, wherein the die holding fixture for the tool unit is disposed axially symmetrically as an axial support, and wherein tool unit is fixed in the die holding fixture on a rotary table that is rotatable in the horizontal plane.

11. A machine tool in accordance with claim 10, wherein the rotary movement of the rotary table is limited in both directions by stops.

12. A machine tool in accordance with claim 10, wherein a motor rotary drive is provided for the rotary table.

13. A machine tool in accordance with claim 12, wherein said motor rotary drive is in the form of a hydraulic motor.

14. A machine tool in accordance with claim 12, wherein the rotary table has a toothed wheel rim extending on the outer circumference and the rotary drive has a pinion gear that is engageable with the toothed wheel rim.

15. A machine tool in accordance with claim 11, characterized in that the rotary table (20) has a drive shaft (22), extending downwardly through the matrix plate (9) and in that the rotary drive (21) acts on the drive shaft (22).

16. A machine tool in accordance with claim 13, characterized in that the rotary drive (21) has a toothed drive wheel (23) and the drive shaft (22) has a toothed drive wheel (24) and in that both toothed wheels (23, 24) are connected by means of a chain or a toothed belt (25).

17. A machine tool in accordance with claim 10, wherein the driving connection of the tool unit with the upper die support is in a rotary symmetrical manner.

18. A machine tool in accordance with claim 10, wherein the matrix plate has a lower saddle plate which receives the rotary table in the die holding fixture, which is in the form of an axial support, and an upper plate, which is clampable to the saddle plate and which receives the remainder of the die holding fixtures for said lower dies.

* * * * *